(12) United States Patent  (10) Patent No.: US 8,695,614 B2
Chaimovski et al.  (45) Date of Patent: Apr. 15, 2014

(54) AIR COOLED UMBRELLA

(71) Applicants: Dan Chaimovski, Tel Aviv (IL); Reuven Marko, Netanya (IL)

(72) Inventors: Dan Chaimovski, Tel Aviv (IL); Reuven Marko, Netanya (IL)

(73) Assignee: Dan Chaimovski, Tel Aviv (IL)

( * ) Notice: Subject to any disclaimer, the term of this patent is extended or adjusted under 35 U.S.C. 154(b) by 0 days.

(21) Appl. No.: 13/888,915

(22) Filed: May 7, 2013

(65) Prior Publication Data

US 2013/0240006 A1 Sep. 19, 2013

Related U.S. Application Data

(63) Continuation of application No. PCT/IL2011/000856, filed on Nov. 3, 2011.

(60) Provisional application No. 61/411,255, filed on Nov. 8, 2010.

(51) Int. Cl.
*A45B 23/00* (2006.01)

(52) U.S. Cl.
USPC .................................... 135/16; 135/33.7

(58) Field of Classification Search
USPC ...................... 135/16, 91, 93, 33.7
See application file for complete search history.

(56) References Cited

U.S. PATENT DOCUMENTS

| | | | |
|---|---|---|---|
| 3,739,792 A * | 6/1973 | Holland | 135/16 |
| 4,023,582 A | 5/1977 | Buzzella et al. | |
| 4,505,285 A | 3/1985 | French | |
| 5,007,811 A | 4/1991 | Hopkins | |
| 5,104,211 A | 4/1992 | Schumacher et al. | |
| 5,207,238 A * | 5/1993 | Rivera et al. | 135/16 |
| 5,273,062 A * | 12/1993 | Mozdzanowski | 135/16 |
| 5,349,975 A | 9/1994 | Valdner | |
| 5,868,152 A | 2/1999 | Brown | |
| 6,017,188 A | 1/2000 | Benton | |
| 6,298,866 B1 * | 10/2001 | Molnar, IV | 135/16 |
| 6,830,058 B2 | 12/2004 | Li | |
| 6,837,255 B2 | 1/2005 | Bunch et al. | |
| 6,923,194 B2 | 8/2005 | Li | |
| 7,000,624 B2 | 2/2006 | Chang | |
| 7,013,903 B2 | 3/2006 | Li | |
| 7,322,208 B1 * | 1/2008 | Griffin | 62/420 |
| 7,341,068 B2 | 3/2008 | Liu | |
| 7,431,469 B2 | 10/2008 | Li | |

(Continued)

OTHER PUBLICATIONS

International Search Report for the corresponding International Patent Application PCT/IL2011/000856; Date of Mailing: Apr. 23, 2012.

*Primary Examiner* — Noah Chandler Hawk
(74) *Attorney, Agent, or Firm* — Myers Wolin, LLC

(57) ABSTRACT

An air cooled sunshade constructed to provide cooling under the canopy of the sunshade. The foldable canopy of the sunshade includes a plurality of segments of elongated panels having embedded solar panels and a plurality of segments of pliable material to allow the canopy to easily stretch when in the open position and collapse in the closed position, typically arranged having one elongated panel connected on foldable material segment arranged around a center piece. In an embodiment disclosed herein, the pliable material is formed as a pipe having an upper layer and a lower layer, the lower layer having pores through which air can flow to the area under the canopy. The air can then flow from a fan or an air conditioner mounted on the center piece and allowing air to flow evenly under the canopy. The solar panels are connected to provide the necessary energy.

10 Claims, 4 Drawing Sheets

(56) References Cited

U.S. PATENT DOCUMENTS

| | | | |
|---|---|---|---|
| 7,513,126 B2 * | 4/2009 | Boland | 62/310 |
| 7,537,015 B1 | 5/2009 | Molnar, IV et al. | |
| 7,550,931 B2 * | 6/2009 | Lys et al. | 315/291 |
| 7,550,935 B2 * | 6/2009 | Lys et al. | 315/318 |
| 7,562,667 B2 | 7/2009 | Li | |
| 7,575,008 B1 * | 8/2009 | Casey | 135/16 |
| 7,674,002 B1 | 3/2010 | Wang | |
| 8,375,966 B2 * | 2/2013 | Kuelbs | 135/16 |
| 2002/0144721 A1 * | 10/2002 | Kronin et al. | 135/16 |
| 2004/0084071 A1 | 5/2004 | Gray | |
| 2005/0161067 A1 | 7/2005 | Hollins | |
| 2005/0164627 A1 | 7/2005 | Boone, Jr. | |
| 2008/0092936 A1 | 4/2008 | Carabillo | |
| 2008/0235086 A1 | 9/2008 | Ma | |
| 2009/0058354 A1 * | 3/2009 | Harrison | 320/101 |
| 2009/0283121 A1 * | 11/2009 | Chu | 135/16 |

* cited by examiner

AIR COOLED UMBRELLA

CROSS-REFERENCE TO RELATED APPLICATIONS

This application is a continuation application of International application No. PCT/IL2011/000856 filed on Nov. 3, 2011 which claims the benefit of U.S. provisional patent application No. 61/411,255 filed on Nov. 8, 2010, the contents of which are incorporated herein by reference.

TECHNICAL FIELD

The invention generally relates to umbrellas, and more specifically to umbrellas used to cover a larger sitting or playing area, and even more specifically to umbrellas that are equipped with solar cells to generate electrical energy.

BACKGROUND

The use of umbrellas in general, and in particular use of umbrellas for the sake of shading larger sitting and playing areas is well-known in the art. Such use provides shade and a somewhat cooler and less exposed area to beaming sun rays. However, on hot days in general, and in particular on windless days, heat in the canopied area may still be unpleasant. Therefore different solutions have been proposed to help in removing the warm air that accumulates in the canopy area. Some such solutions provide fans as part of the canopy to enable movement of such warm air.

With the advent of solar cells, some solutions even propose the addition of solar cells to harness the sun's energy for the production of electricity and driving the fans therefrom. This is of particular use when the umbrella is placed in such areas as the beach or other areas where the use of high voltage electricity is not practical or hazardous. The solutions provided in the prior art suffer from various disadvantages, including, but not limited to, insufficient solar cells to accumulate enough energy, exposed fan wings, and limited cooling capabilities.

It would therefore be advantageous to provide a solution that would overcome the deficiencies of the prior art. In particular it would be advantageous if such a solution provided for ample conversion of solar energy to electrical energy, be safe to use, and provided extended cooling capabilities.

BRIEF DESCRIPTION OF THE DRAWINGS

The disclosed subject matter is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
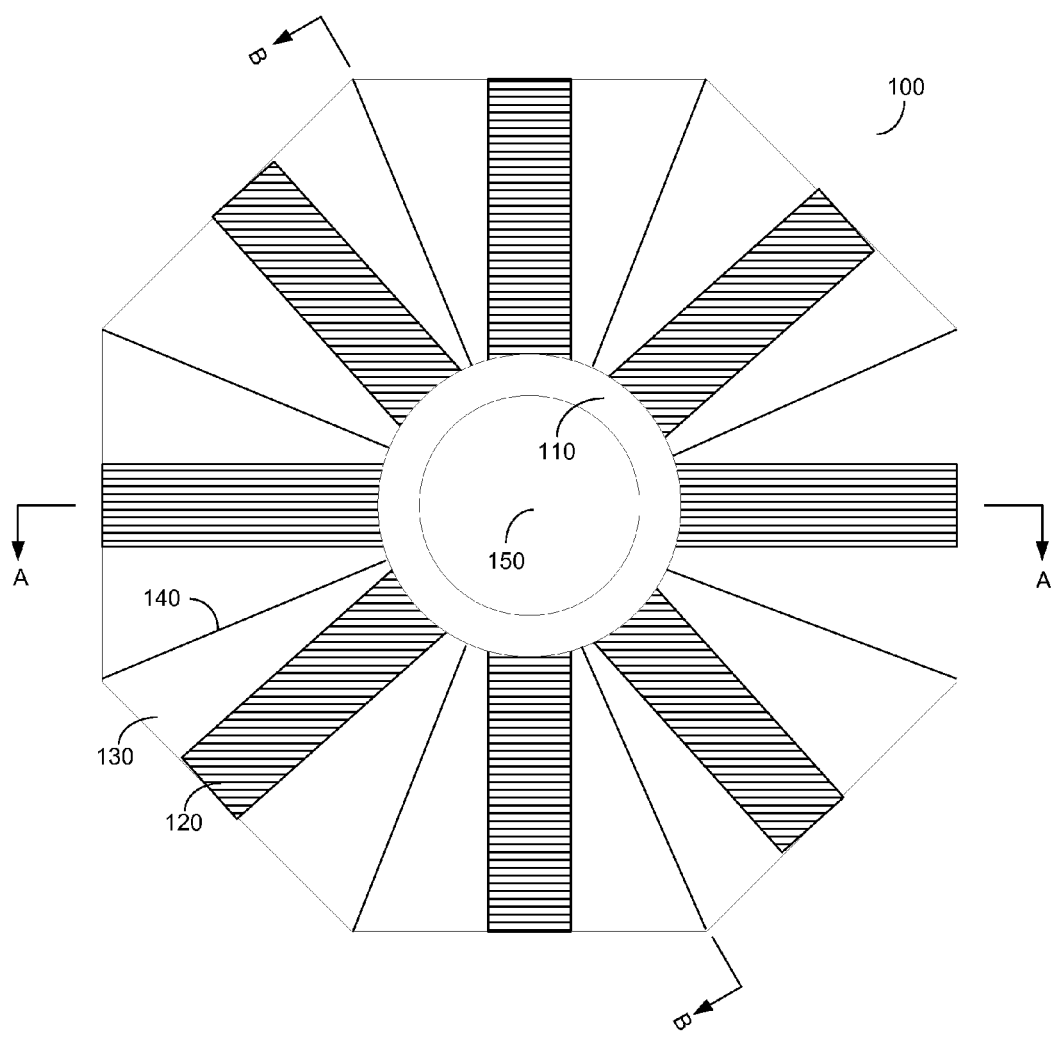
FIG. 1 is a top view of an opened canopy of an umbrella implemented according to the disclosed embodiments.

The embodiments disclosed are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein include an air cooled sunshade, e.g., umbrella provides cooling under the canopy of the umbrella. The foldable canopy of the umbrella is comprised of a plurality of segments of elongated panels that have embedded solar panels and a plurality of segments of foldable material to allow the canopy to easily stretch when in the open position and collapse when in the closed position, typically arranged by having one elongated panel connected on a foldable material segment arranged around a center piece.

In one embodiment, the foldable material is formed as a pipe having an upper layer and a lower layer, the lower layer having pores through which air can flow to the area under the canopy. The air can then flow from a fan, or an air conditioner mounted on the center piece, thereby allowing air to evenly flow under the canopy. The solar panels are connected to provide the necessary energy.

According to various disclosed embodiments, a sunshade, for example in the form of an umbrella, is created from a plurality of two types of segments that are connected to each other. A first type of segment is an elongated panel into which at least a solar cell is embedded. The panel may be constructed of fortified glass or durable transparent plastic of any kind suitable for the task. The second type of segment is made of a durable but pliable material in an elongated form that is connected to the first type of segment along its long side. Such pairs of segments are then connected to each other to create the canopy of the sunshade. Any one of these segments may be further equipped with a rib at the bottom part of the segment to be connected to a radial support arm. The radial support arm is connected to a sliding ring that is mounted on a center pole.

The sliding ring may move up and down the pole to adjust the canopy, from a closed position when the sliding ring moves to its lowest position on the pole, to a fully opened canopy when the sliding ring is at its highest point on the pole. A fan is mounted in a housing at the top of the sunshade such that air is sucked in from the outside, through the fan housing. The housing is designed to have a plurality of output tubes located at positions corresponding to the second type of segment. This segment is further designed as a tube having an upper side and a bottom side, the tube being closed at one end and fitting the output of the housing at the other end. The bottom side is further designed to have pores in various locations on the bottom side. When air flows through the housing it is pushed into the plurality of second segments and flows in, preferably, a laminar fashion from the pore in the bottom side of the second segment downwards, thereby spreading the airflow evenly throughout the canopy. In one embodiment, instead of the housing having a mere fan, it is equipped with a direct current (DC) air conditioner and hence can provide ample cooling to the area under the canopy. The first type of segment has all the electrical outputs coming from the solar cells connected to the housing where the electricity is provided to the fan or DC air conditioner, or otherwise to a battery that is part of the housing for the purpose of storage.

In one embodiment, display sheets, made for example of organic light emitting diodes (OLED) are used for at least one of the sides of the segments. These sheets can then be used for display purposes, for example, for the display of an advertisement, in the form of an image and/or a video clip. It may be further used for display on the inside and/or outside of the canopy. The display may use the power provided by the solar cells making it self-sufficient.

FIG. 1 depicts an exemplary and non-limiting schematic diagram of a top view 100 of an opened canopy of a sunshade in the form of an umbrella implemented according to various disclosed embodiments. The canopy is comprised of segments 120, which are segments of the first type as discussed hereinabove, and segments 130, which are segments of the second type as discussed hereinabove. In this exemplary case where the canopy has the exemplary and non-limiting effective shape of an octagon, the segment 130 also has a seam 140 which may be used for the purpose of connecting a rib (not shown) to which a radial support rod is connected. The segments 120 and 130 are connected to each other to form the entire canopy. The segment 120 is an elongated panel into which a solar cell or cells are embedded and further has output wires (not shown) that are used to collect the electric energy and power the systems of the umbrella as discussed herein below in more detail. The segment 130 is formed as a tube having its outer end sealed, and connected on its other end to the bottom part 110 of a housing 150 to allow the flow of air from the housing 150 into the tube of segment 130, as further explained below with respect of FIG. 3.

In one embodiment, at least one of the segments 120 or 130 is coated with an OLED sheet that is further electrically connected to the housing 150. A control circuit within the housing 150 controls the display on the OLED sheet(s) providing, for example, advertisements displayed on at least portions of the canopy. Typically the advertisement, or otherwise an image or video clip, is stored in a memory of the control circuit. In one embodiment, an interface, such as a universal serial bus (USB) connected to the control circuit, is used for the purpose of uploading displayable content to the memory. In yet another embodiment, a battery is used to store energy and in yet another embodiment, an electrical cord allows the connection of the system to an electric outlet to allow for the supply of electricity to the umbrella to supplement the energy harvested from the sun.

Figure 2:
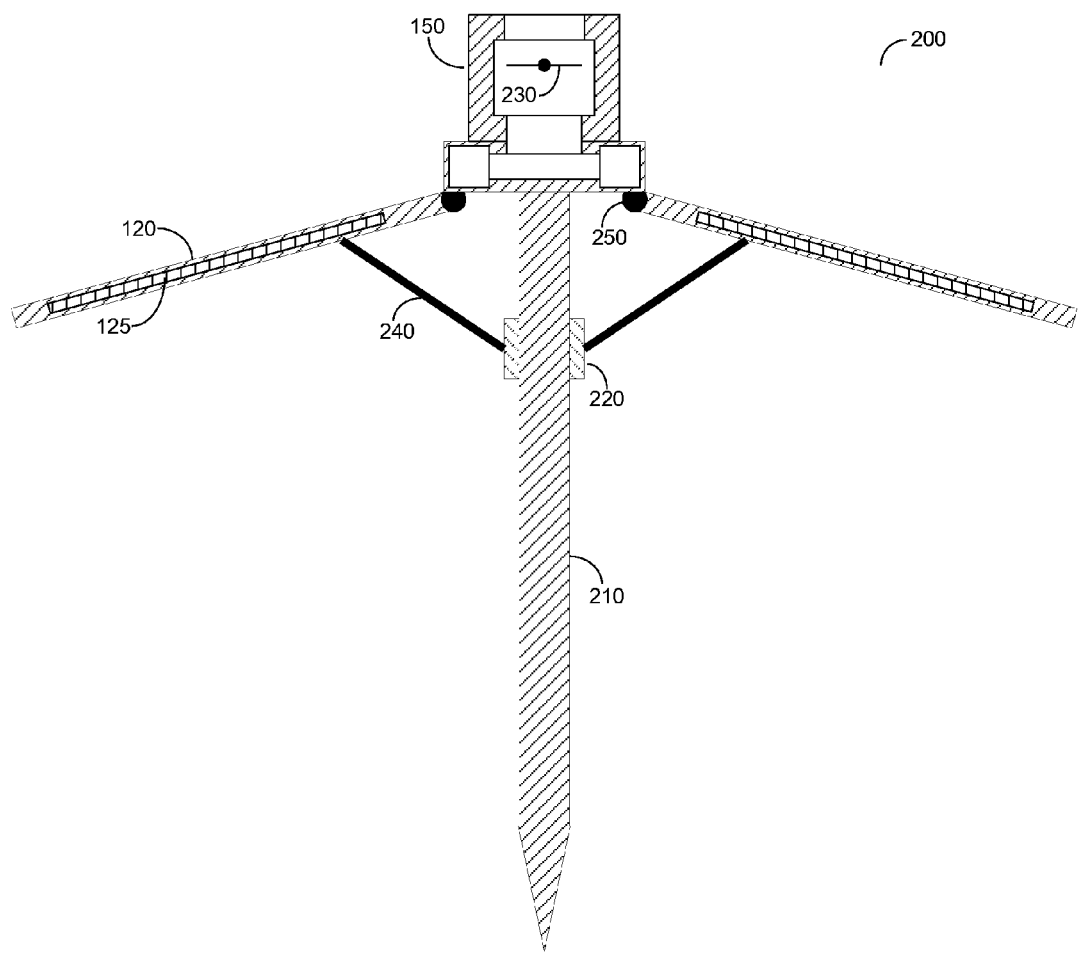
FIG. 2 is first cross-section A-A of a side view of the umbrella.

FIG. 2 shows an exemplary and non-limiting first cross-section A-A 200 of a side view of the umbrella. The canopy is mounted on a rod 210, equipped, for example, in one end with a sharp point for the purpose of affixing the rod into the ground. This cross-section A-A cuts through the panels 120 to reveal the solar cell 125, embedded within the panel 120. An electrical connection from the segment 120 provided from the solar cell 125 is connected to the housing 150 to form an electrical circuit (not shown) that would be obvious to those of ordinary skill in the art. The segments 120 are connected to the housing 150 by means of a pivot 250 that allows the segment 120 to move upwards when the canopy is to be opened and downwards when the canopy is to be closed. Radial support rods 240 may be affixed to the segment 120 at one end and to a sliding ring 220 on the other end. As the sliding ring 220 is pushed up or down, the canopy will either open or close respectively. The sliding ring 220 can be locked into position by means known to those of ordinary skill in the art and are therefore not shown herein. The housing 150 houses a fan 230 that when allowed to spin using the power provided from the solar cell 125 pushes air through the chamber of the housing 150 sucking air from the outside top and into the chamber, and as further explained in more detail with respect of FIG. 3. While a fan 230 is shown herein, it is envisioned that the fan can be replaced by a DC air-conditioner, such that the housing 150 is configured of moving air that was chilled in the DC air-conditioner through the chamber of the housing 150.

Figure 3:
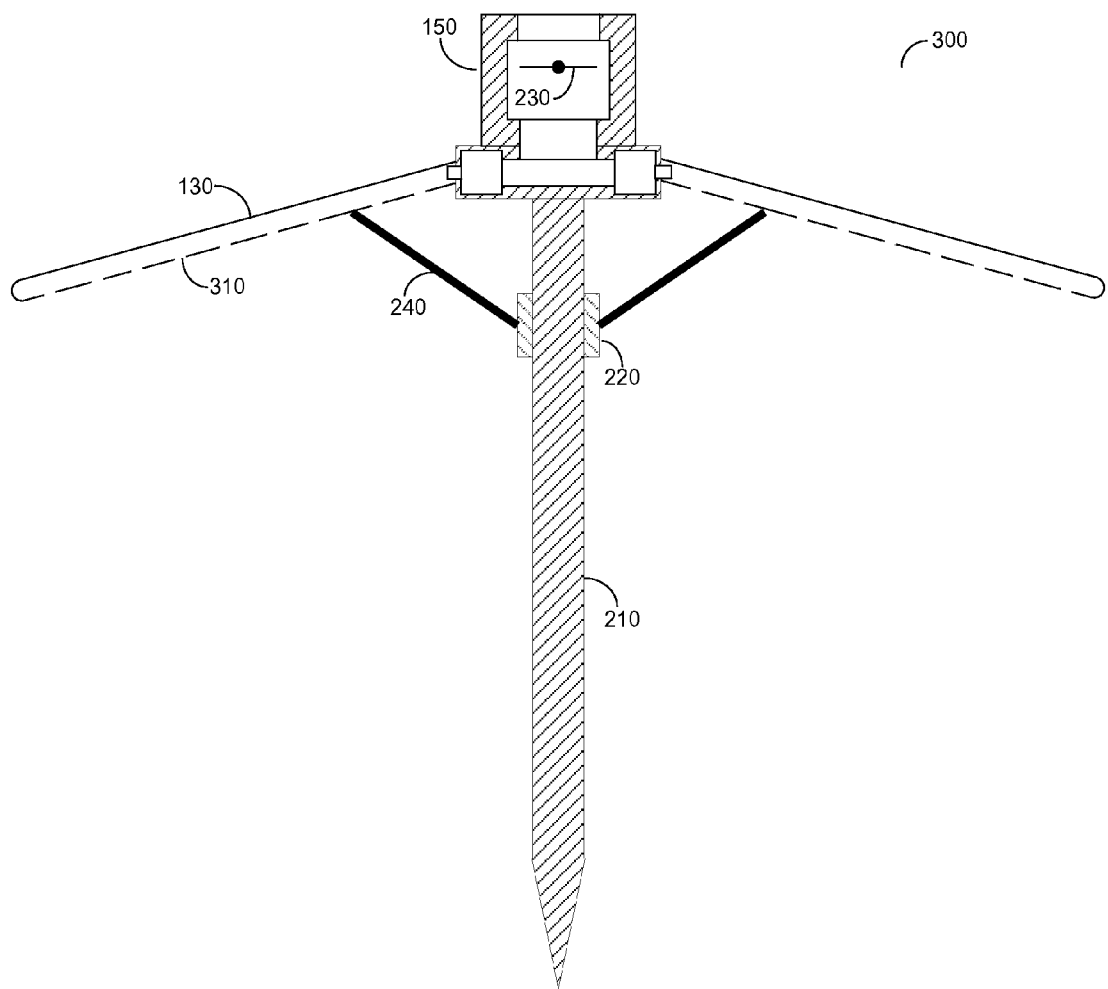
FIG. 3 is a second cross-section B-B of a side view of the umbrella.

FIG. 3 shows an exemplary and non-limiting second cross-section B-B 300 of a side view of the umbrella. This cross-section B-B cuts through the tube segment 130. The segment 130 has an upper part which is sealed and a bottom part which has pores 310. The segment 130 is sealed on one end of its length and is connected to a tube that leads into the chamber of the housing 150 in the other end. This allows the flow of air from the chamber of the housing 150 through the tube of segment 130 and then through the pores 310 of the bottom part of the segment 130 providing an essentially laminar air flow from the top of the umbrella towards the bottom, providing a cooler sensation to persons sitting under the canopy. In the embodiment where a DC air conditioner is used in the housing 150, an air conditioned environment is provided.

In one embodiment, additional electronics may be added to be powered from the housing 150. For example, loudspeakers may be added to allow the playing of music from a gadget such as an Apple Computers® iPod® and other like devices. In yet another embodiment, the panel may be replaced by pliable and/or foldable solar panels to provide additional folding capability of the canopy.

Figure 4:
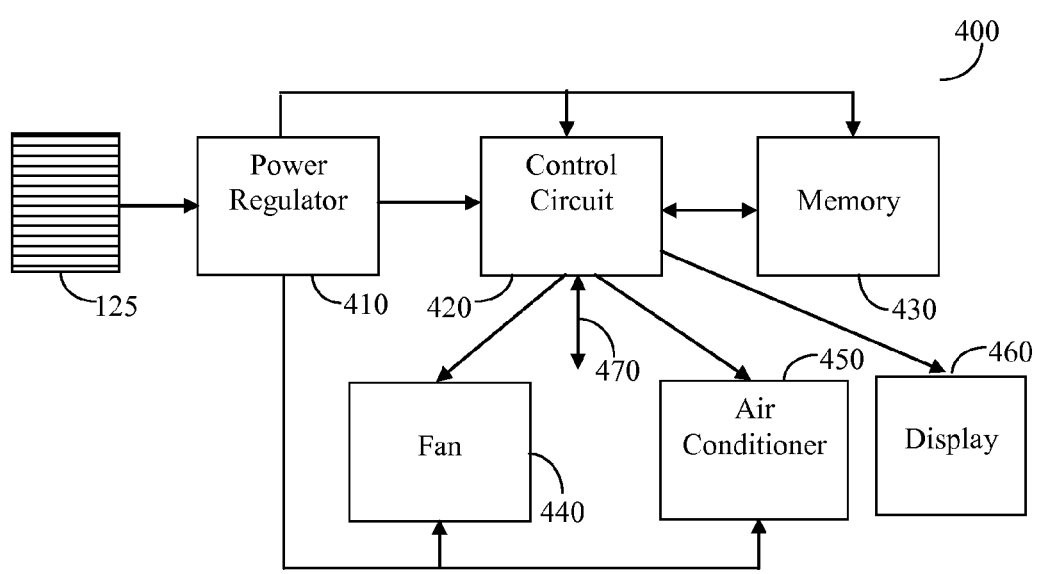
FIG. 4 is a schematic block diagram of the electrical circuit for a sunshade.

FIG. 4 shows an exemplary and non-limiting schematic block diagram 400 of the electrical circuit for a sunshade, e.g., the umbrella discussed in greater detail hereinabove. The solar cells 125 feed a power regulator 410 which generates one or more supply voltages as may be necessary. The power regulator 410 provides the power to the elements of the circuit. A control circuit 420, which may be comprised of a microprocessor or microcontroller, is connected to memory 430 which may store a plurality of instructions for the control of other parts of the circuit. The memory 430 may further contain content uploaded to the memory via, for example, interface 470. The control circuit 420 controls the operation of the fan 440 and the optional air conditioner 450. A display 460 connected to the control circuit 420 and optionally coupled to the memory 430 allows the display of content from the memory 430 under the control of the control circuit 420.

All examples and conditional language recited herein are intended for pedagogical purposes to aid the reader in understanding the disclosed teachings, embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A sunshade, comprising:
   a plurality of elongated panels containing solar cells, each of the elongated panels having an upper side and a bottom side, wherein the solar cells are placed to receive solar rays from the upper side of each of the elongated panels;
   a plurality of elongated segments made of a pliable material, wherein each of the plurality of elongated segments is in a form of a sleeve, each sleeve of the plurality of sleeves having an upper side and a bottom side, the bottom side having pores, each of the elongated segments is connected between two of the plurality of elongated panels, such that a canopy is formed from the plurality of elongated panels and the plurality of elongated segments arranged in an alternating pattern;

a base portion connecting the plurality of elongated panels and the plurality of elongated segments at a narrow side of each of the panels and each of the segments allowing each of the plurality of elongated panels and the plurality of elongated segments to move at the point of connection to the base portion for the purpose of opening or closing the canopy; and a housing connected on top of the base portion and constructed to contain: a plurality of output tubes to each of the plurality of sleeves, an electrical circuit to receive the energy generated in each of the solar cells of the plurality of elongated panels and to generate a regulated voltage therefrom, and at least a fan receiving power from the electrical circuit to force air from outside of the canopy through the connecting tubes and into the plurality of sleeves in order to enable air to flow into the area under the canopy, thereby providing a cooling sensation to a user under the canopy.

2. The sunshade of claim 1, wherein the sunshade is an umbrella.

3. The sunshade of claim 1, wherein the sunshade further comprises:

a plurality of support rods connected to at least one of the plurality of elongated panels and at least one of the plurality of elongated segments;

a pole connected to the bottom of the base portion; and a ring mounted around the pole to which the plurality of support rods are connected, wherein upon moving of the ring away from the bottom of the base portion causes the canopy to close and upon moving the ring towards the bottom of the base portion causes the canopy to open.

4. The sunshade of claim 1, further comprising:

a display coupled to at least one of: a part of the at least one of the plurality of elongated panels and at least one of the plurality of elongated segments; and a control circuit in the housing to control the display.

5. The sunshade of claim 4, wherein the display is at least one of: a liquid crystal display (LCD) and an organic light emitting diodes (OLED) display.

6. The apparatus of claim 4, wherein the display is used for the purpose of displaying at least an image stored in a memory of the control circuit.

7. The apparatus of claim 4, wherein the display is used for the purpose of displaying at least a video clip stored in the memory of the control circuit.

8. The apparatus of claim 4, further comprising:

an interface for uploading displayable content to the memory of the control circuit.

9. The sunshade of claim 1, wherein the housing further contains an air conditioner for the purpose of cooling the air from outside prior to moving the air into the plurality of sleeves.

10. The sunshade of claim 9, wherein the air conditioner is powered by direct current (DC).

* * * * *